US00RE35490E

United States Patent [19]

Ohura et al.

[11] E Patent Number: Re. 35,490

[45] Reissued Date of Patent: Apr. 8, 1997

[54] THIN FILM MAGNETIC HEAD HAVING MAGNETIC LAYERS OF DIFFERENT THICKNESS AND MANUFACTURING METHOD THEREFOR

[75] Inventors: Masaki Ohura, Odawara; Makoto Saito, Hinodemachi, both of Japan

[73] Assignee: Hitachi, Ltd., Tokyo, Japan

[21] Appl. No.: 295,777

[22] Filed: Jan. 11, 1989

Related U.S. Patent Documents

Reissue of:

[64] Patent No.: 4,636,901
Issued: Jan. 13, 1987
Appl. No.: 463,656
Filed: Feb. 3, 1983

[30] Foreign Application Priority Data

Feb. 5, 1982 [JP] Japan ..... 57-16220

[51] Int. Cl.[6] ..... G11B 5/147; G11B 5/127

[52] U.S. Cl. ..... 360/126; 360/125; 360/110; 360/119

[58] Field of Search ..... 360/125, 119, 360/121, 123, 126, 127, 122, 110

[56] References Cited

U.S. PATENT DOCUMENTS

| | | | |
|---|---|---|---|
| 3,152,225 | 10/1964 | Peters | 360/119 |
| 4,295,173 | 10/1981 | Romankiw et al. | 360/125 |
| 4,423,451 | 12/1983 | Chi | 360/113 |
| 4,429,337 | 1/1984 | de Wilde | 360/125 |
| 4,490,760 | 12/1984 | Kaminaka et al. | 360/126 |
| 4,575,777 | 3/1986 | Hosokawa | 360/123 |

FOREIGN PATENT DOCUMENTS

| | | | |
|---|---|---|---|
| 55-70933 | 5/1980 | Japan . | |
| 56-61018 | 5/1981 | Japan | 360/119 |
| 56-93111 | 7/1981 | Japan | 360/122 |
| 57-113409 | 7/1982 | Japan | 360/113 |
| 57-189320 | 11/1982 | Japan | 360/113 |

OTHER PUBLICATIONS

IBM Publication No. EP–A–0012326, published Jun. 25, 1980, Anderson et al.

IBM Publication No. EP–A–0013363, published Jul. 23, 1980, Kennedy et al.

*Primary Examiner*—Stuart S. Levy
*Assistant Examiner*—Jeff Evans
*Attorney, Agent, or Firm*—Antonelli, Terry, Stout & Kraus

[57] ABSTRACT

A thin film magnetic head for performing recording and readout operations to a magnetic recording medium and a method of manufacturing the head. The magnetic head [comprises] *includes* a substrate, a first magnetic layer formed on the substrate, a conductor coil on the first layer and a second magnetic layer formed on the conductor coil and the first magnetic layer. The second magnetic layer is imparted with a greater thickness than the first magnetic layer to thereby strengthen the magnetic field for recording and reducing the peak shift making appearance in readout operation due to interference between successively read-out waveforms. The thin film magnetic head exhibits an improved reproduction characteristic which permits reproduction with high fidelity the magnetized locations recorded on the medium with high recording density which assures an improved recording characteristic. *By controlling the thickness of the second magnetic layer at an inclined portion thereof, magnetic saturation thereat is substantially prevented.*

10 Claims, 1 Drawing Sheet

THIN FILM MAGNETIC HEAD HAVING MAGNETIC LAYERS OF DIFFERENT THICKNESS AND MANUFACTURING METHOD THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a thin film magnetic head which can be fabricated with the aid of thin film forming means for forming thin films through plating, vapor deposition, sputtering or the like and a high precision pattern forming means referred to as photolithography.

2. Description of the Prior Art

The magnetic head whose magnetic circuit is implemented with the aid of the thin film technology is generally considered advantageous in that the recording density can be enhanced and increasingly tends to replace the magnetic head of the type in which a coil is wound on a ferrite or permalloy piece. A typical structure of such thin film head is described in detail in Japanese Patent Application Laid-Open No. 84020/80 which corresponds to U.S. Pat. No. 4,219,854. For attaining an increased data recording density with the magnetic circuit of the thin film magnetic head, it is a fundamentally important factor to reduce the thickness of a magnetic layer exposed on an air bearing surface and hence the thickness of a pole piece of the magnetic head. However, in case one and the same magnetic head is destined to serve for both recording and reading data on and from a recording medium, thinning of the pole piece as described above can never be the necessary and sufficient condition for attaining the increased recording density. More specifically, upon recording operation, it is necessary to excite the magnetic circuit by causing an exciting current to flow through the conductor coil to thereby generate a desired magnetic field in the recording medium which is disposed with a predetermined gap from the air bearing surface of the magnetic head. In this connection, the magnetic layer of a reduced thickness is readily magnetically saturated and therefore an increased exciting current can not produce the effective magnetic field. Under the circumstances, it is important to determine the range of the thickness of the magnetic layer which satisfies the conditions for assuring both the recording and the reading operations in a satisfactory manner. At present, however, the prevailing trend is toward the imparting of a high coercive force to the recording medium in an effort to attain the high recording density, which means that the magnetic head has to be capable of producing a magnetic field of a correspondingly increased strength. To meet this requirement, the range of the thickness of the magnetic layer in which both the recording and the reading operations can be effected satisfactorily is inevitably significantly narrowed and, in a extreme case, such thickness range will become actually no more available, giving rise to a serious problem to be dealt with.

SUMMARY OF THE INVENTION

It is an object of the present invention to provide a thin film magnetic head which is capable of realizing an increased density recording by producing a magnetic field of a sufficient strength for the satisfactory recording.

It is another object of the present invention to provide a method of manufacturing the thin film magnetic head mentioned above.

*It is a further object of the present invention to provide a thin film magnetic head having magnetic layers for preventing magnetic saturation and a manufacturing method therefor.*

The present invention starts from the discovery that a magnetic circuit constituted by a first magnetic layer of a given thickness and a second magnetic layer of a greater thickness than that of the first magnetic layer is capable of strengthening more the magnetic field for the recording and at the same time more effective for reducing a phenomenon of so-called peak shift, which a high density recording entails, brought about due to interference between subsequent readout waveforms, as compared with the magnetic circuit constituted by the first and the second magnetic layers of a same thickness.

DESCRIPTION OF THE PREFERRED EMBODIMENTS

Figure 1:
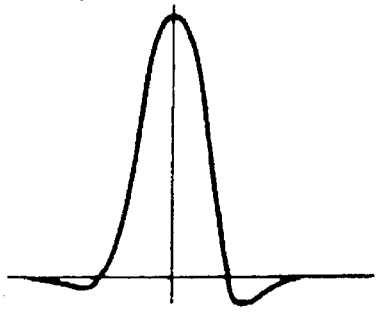
FIG. 1 (PRIOR ART)
FIG. 1 is a diagram showing an isolated or discrete waveform produced by a magnetic head upon reading operation.

Now, the invention will be described in more detail by referring to the drawings.

Figure 3:
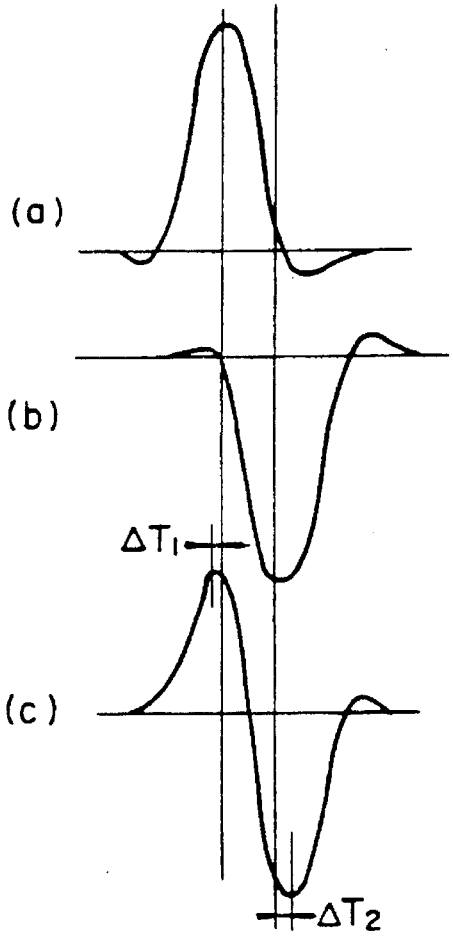
FIG. 3 is a view to illustrate the principle of the invention and shows synthesization of discrete waveforms read out successively by a thin film magnetic head upon reading operation.
Figure 4:
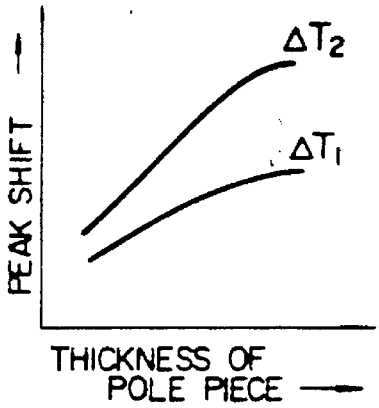
FIG. 4 is a view for illustrating the principle of the invention and graphically shows relationship between the thickness of a pole piece and the peak shift.

FIG. 1 shows an isolated or discrete waveform which corresponds to a single magnetic transition on a recording medium read out by a thin film magnetic head. It will be seen from this figure that undershoots are produced at both sides of the discrete waveform. Such appearance of the undershoots is ascribable to the fact that the thickness of a magnetic layer exposed on an air bearing surface of the thin film magnetic, head and hence the thickness of the pole piece are on the order of several microns, in contrast to the bulk magnetic head of the past. When observed carefully, it will further be seen that the undershoots differ in magnitude from each other. More specifically, the undershoot produced at the lefthand side of the read out waveform relative to the peak position thereof is different in magnitude from the undershoot produced at the righthand side. This can be explained by such a common structure of the conventional thin film magnetic head in which a first magnetic layer 1 extends perpendicularly to a plane of a recording medium 3 while second magnetic layer 2 is bent at an intermediate portion 4, as schematically shown in a sectional view of FIG. 2. In the isolated readout waveform, the undershoot of smaller magnitude corresponds to the second magnetic layer, while the undershoot of greater magnitude corresponds to the first magnetic layer. Now, it will be examined what influences the difference in magnitude of the undershoots exerts to the high density recording. It is generally accepted that the waveforms resulting from data recorded at a high density can be synthesized with considerably high precision by superposing the discrete or isolated waveforms one another. Let's assume that a given magnetic transition is followed by a succeeding magnetic transition with an extremely short interval therebetween. The readout waveforms corresponding to these two magnetic transitions can be obtained as a waveform shown in FIG. 3 at (c) by superposing the isolated or discrete waveforms shown in FIG. 3 at (a) and (b) to each other. It will be noted that the positions of the peaks of the synthesized waveform are shifted from the corresponding peaks of the discrete waveforms, as indicated by $\Delta T_1$ and $\Delta T_2$ in FIG. 3 at (c). In other words, the so-called peak shift has occurred in the superposed or synthesized waveform. The magnitude of the peak shift determined by the steepness of the slope of a foot or base portion of one discrete waveform lying at the position corresponding to the peak of the other waveform. It will be readily understood that when the position of the peak of the succeeding discrete waveform lies in the vicinity of the position which corresponds to the zero-crossing of the preceding discrete waveform, the above mentioned slope of the preceding waveform at that position depends on that magnitude of the corresponding undershoot. Accordingly, comparison of the peak shifts $\Delta T_1$ and $\Delta T_2$ with each other will result in that that magnitude of the peak shift $\Delta T_1$ corresponding to the smaller undershoot is smaller than that of the peak shift $\Delta T_2$. FIG. 4 graphically illustrates experimentally established relationships between the peak shifts $\Delta T_1$ and $\Delta T_2$ and the thickness of the pole piece of a thin film magnetic head with the latter being selected as a variable. As will be appreciated from this graph, the magnitude of the phase shift $\Delta T_2$ is greater than that of the phase shift $\Delta T_1$ and exhibits a greater tendency to depend on the film thickness than that of the phase shift $\Delta T_1$ does for a given thickness of the pole piece. Thus, it can be said that the thickness of the first magnetic layer should be decreased in order to reduce effectively the peak shift in question. More specifically, only the first magnetic layer should rather be thinned than both the first and the second magnetic films be decreased in thickness by a same ratio.

Figure 2:
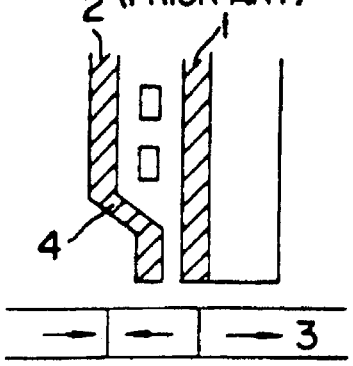
FIG. 2 (PRIOR ART)
FIG. 2 is a schematic sectional view of a hitherto known thin film head.
Figure 5:
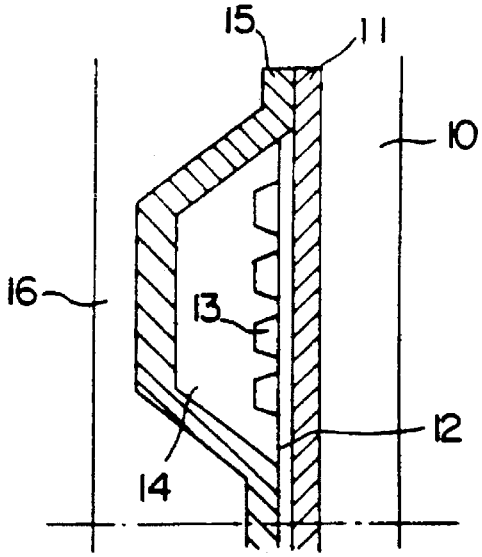
FIG. 5 is a sectional view of a thin film magnetic head according to an embodiment of the invention.

On the other hand, in the recording operation, it is required to produce a magnetic field of high strength on the air bearing surface of the magnetic head in order to magnetize the recording medium, as described hereinbefore, while the magnetic circuit should be realized in such a structure that magnetic saturation is prevented from occurring in the magnetic path as far as practicable. To this end, it is important to increase not only the saturation magnetic flux density of the magnetic layer which constitutes the magnetic path but also the cross-sectional area of the magnetic path. When the thin film magnetic head shown in FIG. 2 is examined in respect to the structure of the magnetic path in the light of the viewpoint mentioned above, it is seen that the bent or sloping portion 4 of the second magnetic layer presents a problem. In general, when a thin film is formed on a horizontally laid member having a step thereon through vapor deposition, sputtering, plating or the like process from above, the thickness of the film formed on a slanted portion or edge of the step is smaller than that of the film formed on the horizontal portion thereof. This tendency is remarkable particularly in the film formation through the vapor deposition and the sputtering. The relative ratio of film thickness between the horizontally laid portions and the slanted portion (this ratio is referred to as coverage factor) depends on the angle of inclination of the slanted portion and generally ranges from 0.7 to 0.8 for the inclination angle of about 30°. It can thus be said that the magnetic saturation is most likely to occur at the slanted portion which is smallest in respect of the cross-sectional area in the whole structure of the thin film magnetic head. Accordingly, in order to make use of the second magnetic layer under magnetically the same condition as the first magnetic layer, the thickness of the second magnetic layer should preferably be selected *to be a predetermined thickness* at a value equal to the quotient obtained by dividing the thickness of the first magnetic layer by the coverage factor. In other words, the thickness of the second magnetic layer should be *about* 1.2 to 1.4 times as great as that of the first magnetic layer. In the foregoing, the reason why the thickness of the second magnetic layer should be increased in both cases of recording and reading as compared with that of the first magnetic layer, has been explained from the view point of resultant advantageous effect.

in the following, an embodiment of the thin film magnetic head according to the present invention will be described by referring to FIG. 5 which shows in a schematic sectional view a thin film magnetic head for a magnetic tape equipment. The first magnetic layer denoted by a reference numeral 11 is formed through sputtering on a substrate 10 in a predetermined pattern in thickness of 1.5 μm and is substantially planar. *The first magnetic layer is then overlaid on or arranged to be overlaying the substrate 10.* The substrate 10 is made of a single crystal sapphire which exhibits an excellent anti-abrasion property. Subsequently, an alumina layer 12 which constitutes a transducing gap is formed to a thickness of 0.5 μm on the first magnetic layer 11, which is followed by formation of a conductor coil 13 in a planar vortex-like pattern through vapor deposition *so that the conductor coil 13 is overlaid on the magnetic layer 11.* After an insulation layer 14 of an appropriate material has been formed so as to level the layer of conductor coil 13, the second magnetic layer denoted by 15 is formed through sputtering in thickness of 2 μm in a predetermined pattern to cover *or overlay* the conductor coil 13 [and], the insulation layer 14 *and the first magnetic layer 11.* At that time, the alumina layer is removed at an end portion on the far side from the air bearing surface of the magnetic head so that the first magnetic film 11 and the second magnetic film 15 are magnetically shorted at that end portion. Subsequently, terminals (not shown) are formed and finally a protection layer 16 of a predetermined thickness is deposited. A plurality of the head elements thus fabricated are disposed in array are cut at a position indicated by a dotted broken line in FIG. 5 so that a predetermined gap depth can be attained at the transducing gap defined by the transducing gap alumina layer 12 sandwiched between the first magnetic layer 11 and the second magnetic layer 15 at the end indicated by dotted broken line. The finished magnetic head element is now obtained. It will be noted that the thickness of the second magnetic layer 15 is selected to be *a predetermined thickness of* 2 μm in contrast to the first magnetic layer which is 1.5 μm thick. This is because the coverage factor of the magnetic layer formed through sputtering on the slanted portions is 0.75. This is, 1.5 μm÷0.75=2 μm. With the aid of the magnetic head element thus realized, two magnetic transitions were recorded with an interval of 2.1 μm on a magnetic tape having a coercive force of 600 Oe. The distance between the readout magnetic transitions was 2.25 μm. In contrast, in the case of a magnetic head fabricated in the same manner as described above and having however the first and the second magnetic layers both of 2 μm thick, the distance between the readout magnetic transitions was 2.8 μm. On the other hand, in the case of a magnetic head in which the first and the second magnetic layers are both 1.5 μm thick, the corresponding distance between the readout transitions was about 2.1 μm. However, it has been found that the output level of the last mentioned head is very low. This can be explained by the fact that saturation occurs in the magnetic path at the time of recording, resulting in that the magnetic transitions are not recorded on the magnetic tape with adequate magnetization. The experimental results mentioned above show obviously that the structure of the thin film magnetic head in which the first and the second magnetic layers are realized in different thickness according to the teaching of the invention exhibits the improved characteristics desirable for this type of magnetic head to an advantage over the prior art magnetic head.

It should be noted that the difference of 0.5 μm in thickness between the first and the second magnetic layers lies outside the range of tolerance (usually ±10% of the film thickness) to be taken into account in the formation of these magnetic layers. By the way, there has been known a thin film magnetic head of such a magnetic circuit configuration in which inner portions of the magnetic layers are partially thickened as compared with the thickness of the portions exposed on the air bearing surface of the magnetic head (i.e. the thickness of the pole piece) with a view to improving the recording and reading behavior of the head. It will be readily appreciated that the principle of the present invention can be equally applied to the thin film magnetic head of such structure, although elucidation is omitted herein.

The present invention has now provided a thin film magnetic head which can enjoy the improved readout or reproduction characteristic which assures the high fidelity reproduction or readout of magnetized locations recorded on the medium at an increased recording density, while enjoying simultaneously the improved recording characteristic. Further, the thin film magnetic head according to the invention can be manufactured through the same process as adopted heretofore without any noticeable modifications except for only the thickness control of the magnetic layers, which involves no increase in the manufacturing cost. Further, the thin film magnetic head is not restricted in its application to the magnetic tape drive but can be widely used for disc drive or floppy disc drive, and additionally in VTR, PCM audio systems or the like.

What is claimed:

1. A thin film magnetic head for performing recording and reading operations to a magnetic recording medium, comprising a substrate, a substantially planar first magnetic layer formed on said substrate and having one end facing toward said recording medium, a conductor coil formed above said first magnetic layer, and a second magnetic layer formed over said conductor coil and said first magnetic layer, said second magnetic layer being spaced from said first magnetic layer to define a magnetic gap at one end facing toward said recording medium and being magnetically shorted to said first magnetic layer at an other end opposite to said one end, said second magnetic layer having a first side portion facing toward said recording medium and a second side portion opposite to said first side portion, both of said first and second side portions being constituted by inclined portions, and said second magnetic layer at least at said one end positioned in opposition to said first magnetic layer with the magnetic gap being interposed therebetween being 1.2 to 1.4 times as thick as said first magnetic layer.

2. A thin film magnetic head according to claim 1, wherein said inclined portions of said second magnetic layer have a substantially same thickness as that of said first magnetic layer.

3. A method of manufacturing a thin film magnetic head for performing recording and reading operations to a magnetic recording medium, comprising the steps of forming through thin film technique a substantially planar first magnetic layer on a substrate so as to have one end facing toward said recording medium, a conductor coil on said first magnetic layer, and a second magnetic layer on said conductor coil and said first magnetic layer, said second magnetic layer being spaced from said first magnetic layer so as to define a magnetic gap at said one end facing toward said recording medium and being magnetically shorted to said first magnetic layer at an other end opposite to said one end, said second magnetic layer having inclined portions at a side facing toward said recording medium and at the opposite side at which said second magnetic layer is magnetically shorted to said first magnetic layer, respectively, and said second magnetic layer at least at said one end positioned in opposition to said first magnetic layer with the magnetic gap being interposed therebetween being 1.2 to 1.4 time as thick as said first magnetic layer.

4. A method of manufacturing a thin film magnetic head according to claim 3, wherein said inclined portions of said second magnetic layer have a substantially same thickness as that of said first magnetic layer.

5. A thin film magnetic head for performing recording and reading operations on a magnetic recording medium, comprising:

a substrate;

a substantially planar first magnetic layer formed on said substrate;

a transducing gap layer formed on said first magnetic layer;

a conductor coil formed on said transducing gap layer; and a second magnetic layer formed over said conductor coil with an insulator interposed between said conductor coil and said second magnetic layer so that said second magnetic layer has inclined portions, said second magnetic layer having one end where said transducing-gap layer is sandwiched between said first and second magnetic layers to constitute a transducing gap at said one end, said second magnetic layer having an other end magnetically shorted with said first magnetic layer, and said second magnetic layer having a thickness at said one end of said position of said transducing gap of 1.2 to 1.4 times the thickness of said first magnetic layer.

6. A thin film magnetic head for performing recording and reproducing operations on a magnetic recording medium, comprising:

a substrate;

a substantially planar first magnetic layer formed on said substrate;

a transducing gap layer formed on said first magnetic layer;

a conductor coil formed on said transducing gap layer;

a second magnetic layer formed over said conductor coil with an insulator interposed between said second magnetic layer and said conductor coil, said second magnetic layer having one end portion at which said transducing gap layer is interposed between said first and second magnetic layers to constitute a transducing gap at said one end portion, said magnetic layer further including a first inclined portion adjacent to said one end portion and a second inclined portion adjacent to an other end portion of said second magnetic layer at which said second magnetic layer is magnetically shorted with said first magnetic layer, and said second magnetic layer having a thickness at said one end portion of 1.2 to 1.4 times the thickness of said first magnetic layer.

7. A method of manufacturing a thin film magnetic head for performing recording and reading operations on a magnetic recording medium, comprising the steps of:

(a) sputtering a magnetic material on a substrate to form a substantially planar first magnetic layer;

(b) providing a first material on said first magnetic layer so as to form a layer constituting a transducing gap;

(c) vapor depositing a conductive material on said transducing gap layer to form a conductor coil;

(d) providing an insulating material on said conductor coil; *and*

(e) sputtering a magnetic material so as to form a second magnetic layer having one end deposited on said transducing gap layer so that said transducing gap layer is interposed between said first and second magnetic layers to constitute a transducing gap at said one end, *an* other end where said second magnetic layer is deposited on said first magnetic layer so that said second magnetic layer is magnetically shorted with said first magnetic layer, and a part of said second magnetic layer between said one end and said [another] *other* end wherein said second magnetic layer is deposited on a surface of a laminate formed through the steps of (a) to (d) so that said second magnetic layer has inclined portions thereat, said second magnetic layer being formed with a thickness at said one end at the position of said transducing gap of 1.2 to 1.4 times the thickness of said first magnetic layer.

*8. A thin film magnetic head for performing recording and reading operations to a magnetic recording medium, comprising:*

*a substrate;*

*a first magnetic layer overlaid on said substrate;*

*a conductor coil overlaid on said first magnetic layer; and*

*a second magnetic layer overlaid on said first magnetic layer and on said conductor coil, said second magnetic layer being spaced from said first magnetic layer to define a magnetic gap at one end facing toward said magnetic recording medium, said second magnetic layer being magnetically shorted to said first magnetic layer at an other end opposite to said one end, said second magnetic layer having inclined portions at parts thereof overlaying said conductor coil between said one end and said other end, said second magnetic layer having a predetermined thickness at least at said one end positioned in opposition to said magnetic recording medium of about 1.2 to about 1.4 times the thickness of said first magnetic layer.*

*9. A thin film magnetic head for performing recording and reading operation to a magnetic recording medium, comprising:*

*a substrate;*

*a first magnetic layer overlaid on said substrate;*

*a conductor coil overlaid on said first magnetic layer; and*

*a second magnetic layer overlaid on said first magnetic layer and on said conductor coil, said second magnetic layer being spaced from said first magnetic layer to define a magnetic gap at one end facing toward said magnetic recording medium, said second magnetic layer being magnetically shorted to said first magnetic layer at an other end opposite to said one end, said second magnetic layer having inclined portions at parts thereof overlaying said conductor coil between said one end and said other end, said second magnetic layer at least at said one end positioned in opposition to said magnetic recording medium having a predetermined thickness greater than that of said first magnetic layer opposite thereto, said predetermined greater thickness being determined by a coverage factor representing the relative ratio of film thicknesses between planar portions and said inclined portions of said second magnetic layer.*

*10. A thin film magnetic head for performing recording and reading operations to a magnetic recording medium, comprising:*

*a substrate;*

*a first magnetic layer overlaid on said substrate;*

*a conductor coil overlaid on said first magnetic layer; and*

*a second magnetic layer overlaid on said first magnetic layer and on said conductor coils;*

*said second magnetic layer being spaced from said first magnetic layer to define a magnetic gap at one end facing toward said magnetic recording medium, said second magnetic layer being magnetically shorted to said first magnetic layer at an other end opposite to said one end, said second magnetic layer having inclined portions at parts thereof overlaying said conductor coil between said one end and said other end, said second magnetic layer at least at said one end positioned in opposition to said magnetic recording medium having a predetermined greater thickness than that of said first magnetic layer opposite thereto, said predetermined greater thickness being determined in accordance with the angle of said inclined portions thereof.*

* * * * *